(12) United States Patent
Breuer

(10) Patent No.: US 10,958,832 B2
(45) Date of Patent: Mar. 23, 2021

(54) CAMERA DEVICE AND METHOD FOR DETECTING A SURROUNDING REGION OF A VEHICLE

(71) Applicant: Conti Temic microelectronic GmbH, Nuremberg (DE)

(72) Inventor: Karsten Breuer, Oberreute (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/467,312

(22) PCT Filed: Dec. 11, 2017

(86) PCT No.: PCT/DE2017/200134
§ 371 (c)(1),
(2) Date: Jun. 6, 2019

(87) PCT Pub. No.: WO2018/184608
PCT Pub. Date: Oct. 11, 2018

(65) Prior Publication Data
US 2019/0364203 A1 Nov. 28, 2019

(30) Foreign Application Priority Data
Apr. 3, 2017 (DE) ...................... 10 2017 205 630.4

(51) Int. Cl.
*H04N 5/232* (2006.01)
*H04N 5/225* (2006.01)
*H04N 7/18* (2006.01)

(52) U.S. Cl.
CPC ....... *H04N 5/23232* (2013.01); *H04N 5/2253* (2013.01); *H04N 5/2254* (2013.01); *H04N 7/183* (2013.01)

(58) Field of Classification Search
USPC ........................................................ 348/148
See application file for complete search history.

(56) References Cited

U.S. PATENT DOCUMENTS 7,986,371 B2 7/2011 Suzuki et al.
8,743,202 B2 6/2014 Schick et al.
(Continued)

FOREIGN PATENT DOCUMENTS

CN 1794792 A 6/2006
CN 101088027 A 12/2007
(Continued)

OTHER PUBLICATIONS

S. Matzka, A. M. Wallace and Y. R. Petillot, "Efficient Resource Allocation for Attentive Automotive Vision Systems," in IEEE Transactions on Intelligent Transportation Systems, vol. 13, No. 2, pp. 859-872, Jun. 2012. doi: 10.1109/TITS.2011.2182610 (Year: 2012).*

(Continued)

*Primary Examiner* — Christopher S Kelley
*Assistant Examiner* — Ana Picon-Feliciano
(74) *Attorney, Agent, or Firm* — W. F. Fasse

(57) ABSTRACT

A camera device (2) for detecting a surrounding region (7) of a vehicle includes an optronic unit (3) configured to capture an image sequence of the surrounding region. The optronic unit includes a wide-angle lens and a high-resolution image sensor. The optronic unit is configured to reduce the resolution in images in the image sequence, in particular by pixel binning, alternatingly differently and asymmetrically in successive images of the sequence.

19 Claims, 2 Drawing Sheets

(56) References Cited

U.S. PATENT DOCUMENTS

| | | |
|---|---|---|
| 9,088,702 B2 | 7/2015 | Oba |
| 9,325,899 B1* | 4/2016 | Chou .................... H04N 5/247 |
| 9,589,194 B2 | 3/2017 | Oshida et al. |
| 9,738,288 B2 | 8/2017 | Inoue et al. |
| 2004/0141067 A1 | 7/2004 | Nakayama et al. |
| 2005/0141607 A1 | 6/2005 | Kaplinsky |
| 2009/0152664 A1* | 6/2009 | Klem ................ H01L 27/14641 257/440 |
| 2010/0002071 A1* | 1/2010 | Ahiska .................. H04N 5/217 348/36 |
| 2011/0052095 A1* | 3/2011 | Deever ................ H04N 5/2173 382/300 |
| 2011/0285866 A1* | 11/2011 | Bhrugumalla ..... H04N 5/23232 348/218.1 |
| 2012/0069224 A1* | 3/2012 | Cilia ...................... G06K 9/325 348/240.99 |
| 2013/0070109 A1* | 3/2013 | Gove .................... H04N 5/347 348/207.1 |
| 2018/0189574 A1* | 7/2018 | Brueckner .......... G06K 9/00791 |
| 2018/0376067 A1* | 12/2018 | Martineau .......... G06K 9/00791 |
| 2019/0050664 A1* | 2/2019 | Yang ....................... G06F 3/011 |

FOREIGN PATENT DOCUMENTS

| | | |
|---|---|---|
| CN | 102387344 A | 3/2012 |
| CN | 104736410 A | 6/2015 |
| CN | 104885448 A | 9/2015 |
| DE | 102015208889 | 11/2016 |

OTHER PUBLICATIONS

English translation of the International Search Report of the International Searching Authority for International Application PCT/DE2017/200134, dated Apr. 6, 2018, 3 pages, European Patent Office, HV Rijswijk, Netherlands.

PCT International Preliminary Report on Patentability including English Translation of PCT Written Opinion of the International Searching Authority for International Application PCT/DE2017/200134, dated Oct. 8, 2019, 6 pages, International Bureau of WIPO, Geneva, Switzerland.

German Search Report for German Patent Application No. 10 2017 205 630.4, dated Aug. 21, 2017, 7 pages, German Patent and Trademark Office, Muenchen, Germany, with partial English translation, 5 pages.

Chinese Office Action and Search Report dated Sep. 27, 2020 in Chinese Patent Application No. 201780084659.1, 7 pages, with partial English Summary of the Examiner's Comments, 2 pages.

* cited by examiner

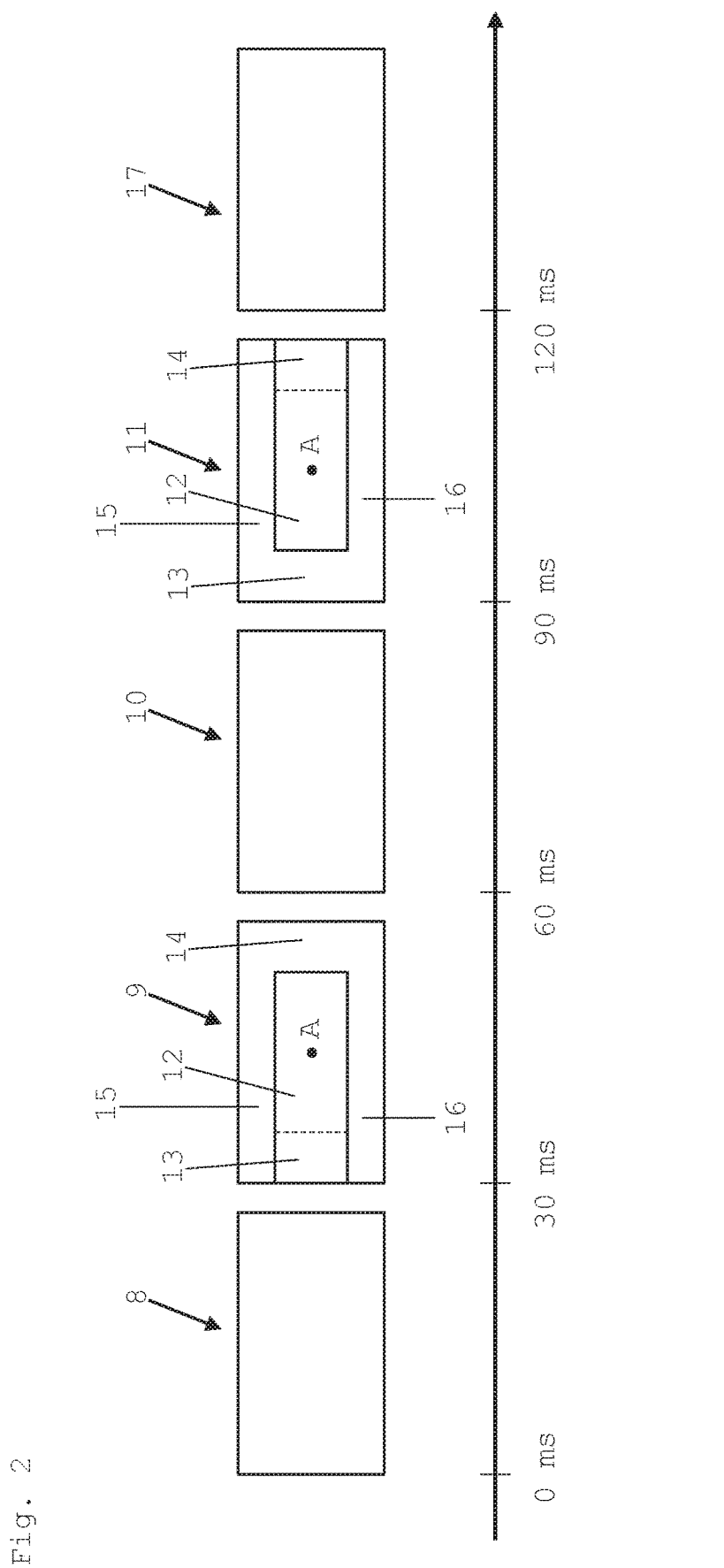

CAMERA DEVICE AND METHOD FOR DETECTING A SURROUNDING REGION OF A VEHICLE

FIELD OF THE INVENTION

The invention relates to a camera device and a method for detecting a surrounding region of a vehicle. The invention further relates to the vehicle having such a camera device.

BACKGROUND INFORMATION

In order to produce driver assistance devices such as traffic sign recognition or a lane departure warning system, camera systems require a horizontal viewing angle of approx. 50 degrees and a vertical viewing angle of approx. 30 degrees. However, new functions such as cross traffic or traffic light recognition notably require a much larger viewing angle in order to be able to detect objects located in the peripheral area of the image during tailgating. In contrast, highly automated driving or a lane departure warning system, for example, also requires recognition of objects and roadway structures at a great distance, necessitating a corresponding resolution.

Since, even in the medium term, image-processing, embedded processors will not be able to process the high resolutions of approx. 8 megapixels directly, i.e. in real time, it is necessary to reduce the resolution. In order to solve this problem, methods are known, in accordance with which 4 pixels are combined in each case (pixel binning) such that a full field of view is available at half resolution in the image. Alternatively, an extract of the field of view can also be simply input, in each case, at full resolution. It is always the case that only one of these images can be input during each time bin resulting from the frame rate of the imager (e.g. 33 frames per second (fps)). That is to say, if a larger horizontal field of view at a high resolution is required (e.g. for a crossroads situation on a country road), the integral parts thereof (that is to say, for instance, the left partial image, the right partial image) have to be input individually, which takes a correspondingly longer period of time. By contrast, a central unbinned image does not offer a sufficiently large field of view for the situation which has been indicated by way of example, such that only the binned image at half the frame rate and with half the resolution can be used. Both methods increase the latency of a system connected to the detection (e.g. emergency braking system), which has an effect on the performance thereof.

SUMMARY OF THE INVENTION

One object of the present invention can therefore be deemed to be to provide a camera device and a method of the type indicated at the outset, which make possible a situation-dependent necessary field of view with the lowest possible latency at the same time as making use of the full resolution of an imager.

The above object can be achieved by the subject matter of the independent claims. Advantageous embodiments form the subject matter of the dependent claims, the following description, and the figures.

According to a first aspect of the invention, a camera device for detecting a surrounding region of a vehicle is provided.

The camera device comprises an optronic unit, comprising a wide-angle lens and a high-resolution image sensor, in particular consisting of a wide-angle lens and a high-resolution image sensor, as well as a control unit which operate the optronic unit, and which is designed to capture an image sequence of the external surroundings of the vehicle. The image sequence of the external surroundings of the vehicle comprises a plurality of images which are captured consecutively in time. In particular, the image sequence comprises the first image, second image, third image and fourth image described in greater detail below. The surrounding region is, for example, a surrounding region which is located in front of, to the side of and/or behind the ego vehicle in the direction of travel.

The wide-angle lens is preferably designed with a horizontal and/or vertical viewing angle of e.g. at least +/−50 degrees, in particular of at least +/−70 degrees and/or of a maximum of +/−80 degrees to the optical axis. A peripheral environment such as a crossroads region can be detected by means of the wide-angle lens, for example, in order to carry out object evaluation of crossing road users at an early stage. The viewing angles determine the field of view (FOV) of the camera device.

Furthermore, the optronic unit comprises a high-resolution image sensor. In particular, object recognition such as the detection of far-range traffic signs or lanes is consequently made possible, in particular at a distance from the ego vehicle of at least 50 meters, by means of the images supplied by the high-resolution image sensor. In particular, the term 'high-resolution image sensor' means an image sensor having a number of pixels of several megapixels, for example of at least five megapixels, preferably of at least seven megapixels, especially of at least ten megapixels. The image sensor preferably has a homogeneous pixel/cm resolution.

The optronic unit and/or an image-processing processor attached thereto are set up to reduce a resolution in a first image of the image sequence and to output the first image with the reduced resolution, wherein the resolution is reduced throughout the first image.

Furthermore, the optronic unit and the control unit which operates it are set up to select a first partial region in a subsequently captured second image of the image sequence, said first partial region comprising the central image region and a first lateral external region, and to simply or exclusively output this first partial region, wherein the resolution of the output first partial region is not reduced.

The optronic unit and/or the image-processing processor are further set up to reduce a resolution in a third image of the image sequence and to output the third image with the reduced resolution, wherein the resolution is reduced throughout the third image.

In addition, the optronic unit and the control unit which operates it are setup to select a second partial region in a subsequently captured fourth image of the image sequence, said second partial region comprising the central region and a second lateral external region, and to simply or exclusively output this second partial region, wherein the resolution of the output second partial region is not reduced.

The central region has a width and a height, is preferably rectangular or square, and extends symmetrically about a midpoint of the relevant image of the image sequence (second image and fourth image). The shape and size of the central region can preferably be specified as being the same for the second image and for the fourth image, however they can alternatively also be specified as being different.

The first lateral external region can, for example, be a left or a right lateral external region of the second image, whereas the second lateral external region can be, for example, a right or a left i.e. complementary lateral external region of the fourth image. In particular, the image regions which do not have a reduced resolution and which are in particular unbinned, can always be half the height and half the width (for the two edge images in total) of the image regions which have a reduced resolution and which are, in particular, binned. However, this does not, under any circumstances, have to be the case. The high-resolution image strips can, in all probability, also have a ratio other than 1:2. It is simply the resolution which definitely has the ratio 2:1 (in the case of a binning of 4 pixels each).

The first lateral external region is attached laterally on the one side of the central region without a transition to the central region, and the second lateral external region is attached on the other side of the central region without a transition to the central region. Consequently, there is no separate central region. The image strips do in each case comprise the central region, however this is an integral part of the respective high-resolution strip. The first lateral external region and the second lateral external region preferably extend up to one of the lateral edges of the relevant image of the image sequence, as a result of which a very wide field of view can be output at full resolution in the second image and in the fourth image in the horizontal direction.

It is preferably provided that the operations described above in connection with the first to fourth image are performed several times in succession, particularly preferably continually one after the other.

According to the present invention, the external regions of the image relevant to crossroads situations can constantly be detected at 75% of the full frame rate (e.g. at 25 fps in the case of a full frame rate of 33 fps). The relevant external regions are also detected at high resolution in turn. The central region is detected with the full frame rate and in turn at high resolution as well. This makes it possible for critical image contents to be detected with a sufficiently high frame rate and the detection range can be maintained at a maximum without overtaxing the image-processing processor. As a result, the latency for active safety systems can be reduced.

In particular, high-resolution image regions, in which the resolution is not reduced, have a higher resolution than the resolution-reduced images. The resolution in the high-resolution image regions in the horizontal and/or vertical viewing angle is preferably at least 40 pixels per degree, especially at least 50 pixels per degree. For example, the high-resolution image regions can be output by the optronic unit with the maximum available resolution.

For example, resolution-reduced image regions, in which the resolution is reduced as described above, each have, at least in regions, a resolution in the horizontal and/or vertical viewing angle of a maximum of 30 pixels per degree, especially a maximum of 20 pixels per degree. The resolution-reduced image regions preferably have at least approximately the same number of pixels and/or a standardized, especially uniformly distributed pixel size distribution. Furthermore, lenses having non-linear distortion characteristics are provided for use. It is true that the pixel sizes can therefore be uniform on the imager, but the image region imaged by one pixel alters in terms of its size via the angle (as a rule, the resolution decreases in Px/° toward the outer sides of the image).

Furthermore, according to a preferred configuration, an upper external region in the second image and/or the fourth image cannot be selected and cannot be output. The upper external region extends in the second and/or the fourth image in the horizontal direction above the central region and preferably over the entire width of the relevant image. Consequently, regions which are, so to speak, "not of interest" to the system (such as, for instance, an image region which shows a sky) are omitted for the high-resolution detection, in order to limit the computational power required to a sensible level.

Similarly, according to a further preferred configuration, a lower external region in the second image and/or the fourth image cannot be selected and cannot be output. The lower external region extends in the second and/or the fourth image in the horizontal direction below the central region and preferably over the entire width of the relevant image. Consequently, regions which are, so to speak, "not of interest" to the system are omitted for the high-resolution detection, in order to limit the computational power required to a sensible level.

The upper external region and the lower external region can be strip-shaped image regions having a reduced resolution, wherein these image regions represent regions in the external surroundings of the vehicle, for which no high detection ranges are required, since the objects located there (e.g. overhead signage) can be sufficiently perceived, even with the reduced resolution. Furthermore, these regions can be less critical, for example, for judging a crossroads situation than regions in the external surroundings of the vehicle, which are represented by the central region and the lateral external regions. The non-selection and the non-outputting of these image regions can consequently make possible a reduced computational power, wherein the latency for active safety systems, in particular, can furthermore be minimized.

According to a preferred embodiment, the image sensor or an image processing apparatus can be set up to reduce the resolution in the first and third image by means of pixel binning. The image processing apparatus can be an integral part of the optronic unit. Admittedly, the image processing apparatus is then, in particular, not an integral part of the optronic unit if it is not part of the image sensor. In this case, it belongs to the processor unit which is connected to the optronic unit. The image sensor can be designed to capture the image sequence with, in particular, exclusively high-resolution images. In particular, during pixel binning, neighboring pixels e.g. within a line and/or a column or in an e.g. rectangular partial region of the image captured in each case can be combined and assigned to a new pixel. The resulting pixel matrix of the resolution-reduced image consequently has, in particular, a lower resolution than the associated captured image.

Furthermore, the camera device preferably comprises at least one detection function such as, for example, for detecting and classifying other road users (vehicles, pedestrians) or for perceiving lane markings.

Furthermore, the camera device preferably comprises at least one driver assistance device such as e.g. a lane departure warning or turn-off assistance device or can be connected thereto. The driver assistance device is in particular designed to perform at least one passive and/or active driver assistance function such as distance warning, emergency braking or an autonomous evasive maneuver, as a function of the at least one evaluated target object.

According to a second aspect of the invention, a vehicle is provided, which comprises a camera device according to the first aspect of the invention. The vehicle is in particular a motor vehicle such as a car, a truck, a municipal vehicle or a bus.

According to a third aspect of the invention, a method for detecting a surrounding region of a vehicle is provided. The method comprises providing a vehicle according to the second aspect of the invention. Furthermore, an image sequence of the external surroundings of the vehicle is captured.

In a first image of the image sequence, a resolution is reduced and the first image is subsequently output with the reduced resolution, wherein the resolution is reduced throughout the first image. In a subsequently captured second image of the image sequence, a central region and a first lateral external region are furthermore selected and exclusively output, wherein the resolution of the central region and of the first lateral external region is not reduced.

In a third image of the image sequence, a resolution is additionally reduced and the third image is then output with the reduced resolution, wherein the resolution is reduced throughout the third image.

In addition, a central region and a second lateral external region are selected and exclusively output in a subsequently captured fourth image of the image sequence, wherein the resolution of the central region and of the second lateral external region is not reduced.

According to an embodiment of the method according to the invention, it is advantageously provided that an upper and/or a lower external region of the second and/or of the fourth image is/are not selected and not output.

Furthermore, it is preferably provided that the resolution in the first image and in the third image is reduced by means of pixel binning by means of the image sensor or by means of an image processing apparatus. The image processing apparatus can be an integral part of the optronic unit. Admittedly, the image processing apparatus is, in particular, not an integral part of the optronic unit if it is not part of the image sensor. In this case, it belongs to the processor unit which is connected to the optronic unit.

According to a fourth aspect of the invention, a program element is provided, which, if it is run on a processor, instructs the processor to perform the method steps of the method according to the third aspect of the invention, wherein all of the method steps are performed which are envisaged following the provision of the vehicle with the camera device.

According to a fifth aspect of the invention, a computer-readable medium is provided, on which a program element is stored, which, if it is run on a processor, instructs the processor to perform the method steps of the method according to the third aspect of the invention, wherein all of the method steps are performed which are envisaged following the provision of the vehicle with the camera device.

BRIEF DESCRIPTION OF THE DRAWINGS

Exemplary embodiments of the invention are explained in greater detail below, with reference to the schematic drawings, wherein:

FIG. 2 shows an image sequence generated by the camera device in accordance with FIG. 1.

DETAILED DESCRIPTION OF EXAMPLE EMBODIMENTS OF THE INVENTION

Figure 1:
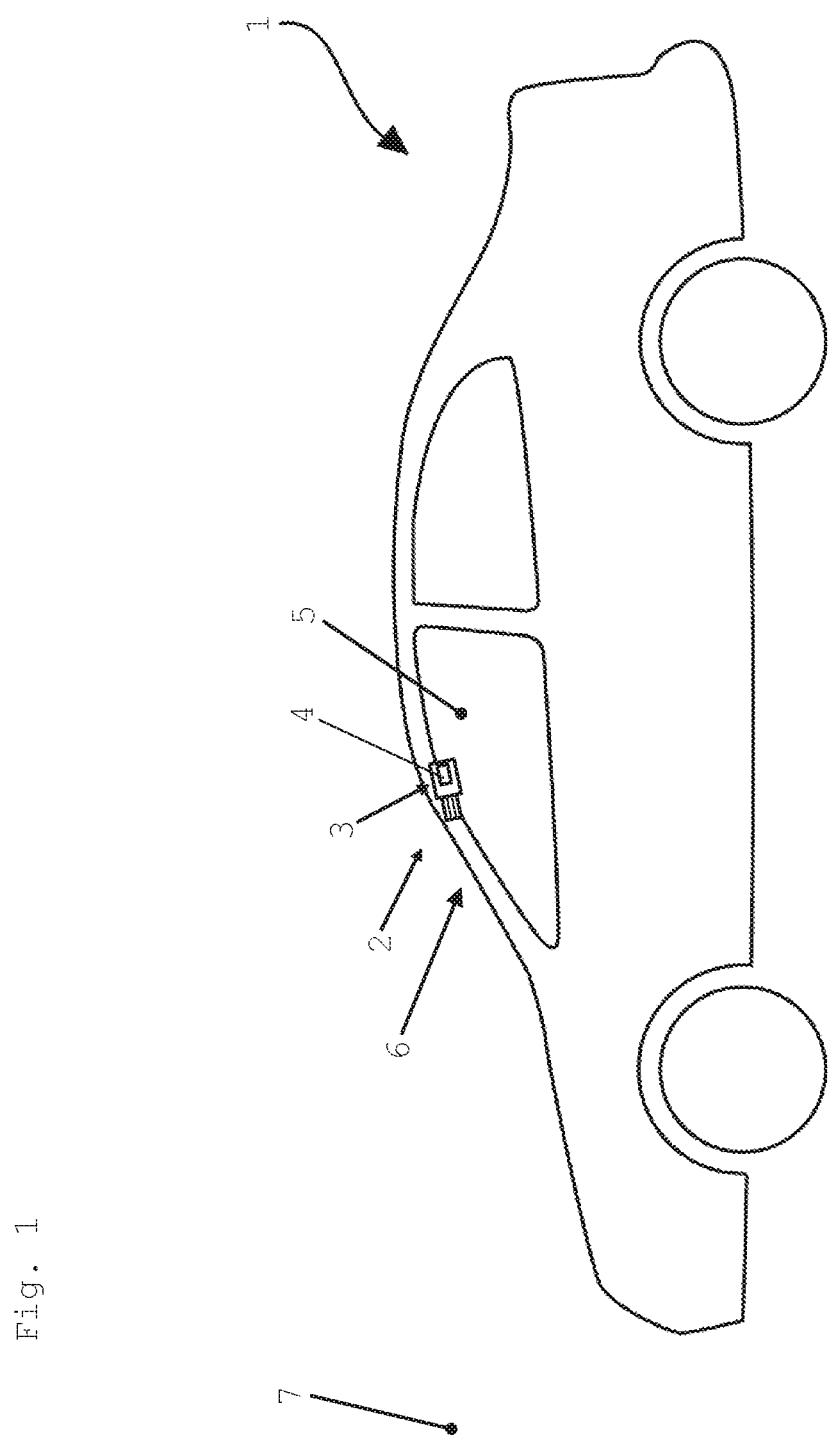
FIG. 1 shows a side view of a vehicle having an exemplary embodiment of a camera device according to the invention.

FIG. 1 shows a vehicle 1 in the form of an automobile. The vehicle 1 comprises a camera device 2 for detecting a surrounding region 7 of the vehicle 1, wherein the camera device 2 in turn comprises an optronic unit 3 having a wide-angle lens and a high-resolution image sensor. Furthermore, the optronic unit 3 can comprise an image processing apparatus 4. If the binning, which is described further below, is performed by an imager, this is implemented in hardware there and can only be parameterized. Software implementation is then not possible in the optronic unit 3, but only in a processor unit which is connected to the imager. In particular, the optronic unit 3 only comprises the lens and the imager. Programs which are run on the processor unit cannot be stored on the optronic unit. This is reserved for the actual processor unit having memory chips attached thereto.

The camera device 2 is arranged in an interior space 5 of the vehicle 1 and indeed, in particular, in a region behind a windshield 6 of the vehicle 1. However, this is merely indicated by way of example. The camera device can likewise be installed on a rear window of the vehicle 1, looking backwards. Multiple external shots or images of the external surroundings 7 of the vehicle 1 can be captured through the windshield 6 by means of the optronic unit 3, wherein the multiple images are captured consecutively in time and form an image sequence of the external surroundings 7 of the vehicle 1.

FIG. 2 shows a first image 8, a second image 9, a third image 10 and a fourth image 11. These four images 8 to 11 were captured by means of the optronic unit 3 of the camera system 2. The contents of the images 8 to 11 are not depicted for the sake of simplicity.

The first image 8 was captured at a first time (0 ms), the second image 9 was subsequently captured at a second time (30 ms), the third image 10 was subsequently captured at a third time (60 ms), and the fourth image 11 was subsequently captured at a fourth time (90 ms). Consequently, each of the images 8 to 11 were each captured at time intervals of 30 ms in length. Of course, other cycles are in principle also possible –30 ms only applies to this specific example. The length of the time interval produces the frame rate which, in the exemplary embodiment shown, is 33 fps (1 second divided by 33 images per second produces a time interval of approx. 30 ms between two consecutive images).

A resolution in the first image 8 can be reduced by means of the optronic unit 3 or the image processing apparatus 4 connected thereto and the first image 8 can be output with the reduced resolution, wherein the resolution is reduced throughout the first image 8. Consequently, the entire first image 8 is output with a full detection region (field of view).

Furthermore, a central region 12 of the second image 9 and a left external region 13 of the second image 9 can be selected and output exclusively by means of the optronic unit 3. By contrast, a right external region 14, an upper external region 15 and a lower external region 16 of the second image 9 are neither selected nor output.

The central region 12 extends symmetrically about a midpoint A of the second image 9 or of the full detection region (field of view). The width of the central region 12 can, for example, correspond to a horizontal viewing angle of 32° (in each case 16° to the right and to the left of the midpoint A; "+–16°"). Together, the central region 12 and the left external region 13 can have a width which corresponds to a horizontal viewing angle of more than 35° (more than 35° to the left of the midpoint A "<–35°" plus the possible 16° to the right of the midpoint A).

A resolution in the third image 10 can additionally be reduced by means of the optronic unit 3 or the image processing apparatus 4 connected thereto and the third image 10 can be output with the reduced resolution, wherein the resolution is reduced throughout the third image 10.

Consequently, the entire third image 10 is output with a full detection region (field of view).

In addition, a central region 12 and a right lateral external region 14 can be selected and output exclusively by means of the optronic unit 3 in the fourth image 11. On the other hand, a left external region 13, an upper external region 15 and a lower external region 16 of the fourth image 11 are neither selected nor output.

The width of the central region 12 can, for example, correspond to a horizontal viewing angle of 32° (in each case 16° to the right of and to the left of the midpoint A; "+−16°"). Together, the central region 12 and the right external region 14 can have a width which corresponds to a horizontal viewing angle of more than 35° (more than 35° to the right of the midpoint A ">+35°" plus the possible 16° to the left of the midpoint A).

The central region 12, the left external region 13, the right external region 14, the upper external region 15 and the lower external region 16 of the fourth image 11 are identical to the corresponding regions 12 to 16 in the second image 9 in the exemplary embodiment shown in FIG. 2.

The reductions of the resolutions in the images 8 and 10 described above can be achieved by means of pixel binning, wherein the image sensor or the image processing apparatus 4 can in particular be used for this purpose.

A fifth image 17 captured by the optronic unit 3, which has been captured after 120 ms, is depicted in FIG. 2. The aim of the fifth image 17 is to illustrate that the cycle indicated above consisting of the receipt of four images 8 to 11 and (partial) reduction of the resolution in the images 8 to 11 starts again upon capture of a further image 17.

The invention claimed is:

1. A camera device for detecting external surroundings of a vehicle, the camera device comprising:
   an optronic unit that comprises a wide-angle lens and a high-resolution image sensor, as well as
   a control unit configured to operate the optronic unit, wherein:
   the camera device is configured to capture an image sequence comprising a repeating cycle of several successive sets of successively captured first, second, third and fourth images of the external surroundings of the vehicle captured at a predetermined frame rate of the images,
   the optronic unit is configured to reduce a resolution throughout the first image and to output the first image with the reduced resolution,
   the optronic unit and the control unit are configured to select a first partial region in the second image comprising a central region and a first lateral external region in the second image, and to output exclusively the first partial region of the second image, wherein a resolution of the output first partial region is not reduced,
   the optronic unit is configured to reduce a resolution throughout the third image and to output the third image with the reduced resolution,
   the optronic unit and the control unit are configured to select a second partial region in the fourth image comprising the central region and a second lateral external region in the fourth image, and to output exclusively the second partial region of the fourth image, wherein a resolution of the output second partial region is not reduced,
   the central region is output in all of the images at 100% of the predetermined frame rate,
   the first lateral external region is output in 75% of the images at 75% of the predetermined frame rate, and
   the second lateral external region is output in 75% of the images at 75% of the predetermined frame rate.

2. The camera device according to claim 1, wherein an upper external region in the second image and/or in the fourth image is not selected and not output.

3. The camera device according to claim 1, wherein a lower external region in the second image and/or in the fourth image is not selected and not output.

4. The camera device according to claim 1, wherein the image sensor of the optronic unit or an image processing apparatus of the camera device is configured to reduce the resolution in the first image and in the third image by pixel binning.

5. A vehicle comprising a camera device according to claim 1 mounted on a vehicle body.

6. A method of detecting external surroundings of a vehicle, the method comprising the steps:
   receiving an image sequence comprising a repeating cycle of several successive sets of successively captured first, second, third and fourth images of the external surroundings of the vehicle captured at a predetermined frame rate of the images,
   reducing a resolution throughout the first image and outputting the first image with the reduced resolution,
   selecting and exclusively outputting a central region and a first lateral external region in the second image, wherein a resolution of the central region and of the first lateral external region of the second image is not reduced,
   reducing a resolution throughout the third image and outputting the third image with the reduced resolution, and
   selecting and exclusively outputting the central region and a second lateral external region in the fourth image, wherein a resolution of the central region and of the second lateral external region of the fourth image is not reduced,
   wherein:
   the central region is output in all of the images at 100% of the predetermined frame rate,
   the first lateral external region is output in 75% of the images at 75% of the predetermined frame rate, and
   the second lateral external region is output in 75% of the images at 75% of the predetermined frame rate.

7. The method according to claim 6, wherein an upper external region and/or a lower external region of the second image and/or of the fourth image is/are not selected and not output.

8. The method according to claim 6, wherein the resolution in the first image and the resolution in the third image are reduced by pixel binning by an image sensor of an optronic unit or by an image processing apparatus.

9. A non-transitory computer-readable medium, on which is stored a program element that, when executed on a processor, causes the method according to claim 6 to be performed.

10. The camera device according to claim 1,
   wherein the central region is output at the reduced resolution at 50% of the predetermined frame rate, and is output at the resolution that is not reduced at 50% of the predetermined frame rate; and
   wherein each respective one of the lateral external regions is respectively output at the reduced resolution at 50% of the predetermined frame rate, and is output at the resolution that is not reduced at 25% of the predetermined frame rate.

11. The camera device according to claim 1,
wherein the central region is respectively contiguous with the first lateral external region and with the second lateral external region; and
wherein the first and second lateral external regions each respectively extend to a respective associated lateral outer edge of a field of view of the optronic unit.

12. The camera device according to claim 1, wherein the central region and the lateral external regions exclude an upper external region and a lower external region and do not extend to an upper edge and a lower edge of a field of view of the optronic unit.

13. The camera device according to claim 1,
wherein the camera device is further configured to perform object recognition on the images output by the optronic unit; and
wherein the optronic unit is configured to select the first partial region and the second partial region before the object recognition is performed.

14. The camera device according to claim 1, wherein a total number of pixels included respectively in each one of the output images is consistently the same in each one of the output first, second, third and fourth images.

15. A method comprising steps:
a) during a first time interval, capturing a first image frame of surroundings of a vehicle with an image sensor of a camera system of the vehicle, processing the first image frame to produce a first image covering a first sensor detection region of the image sensor and having a first resolution throughout the first image, and outputting the first image;
b) during a second time interval sequentially following the first time interval, capturing a second image frame of the surroundings with the image sensor, processing the second image frame to produce a second image covering a second sensor detection region of the image sensor and having a second resolution throughout the second image, and outputting the second image, wherein the second sensor detection region is only a portion of the first sensor detection region and consists of a central region encompassing a center of the first sensor detection region and a left region extending contiguously on a left side of the central region, and wherein the second resolution is higher than the first resolution;
c) during a third time interval sequentially following the second time interval, capturing a third image frame of the surroundings with the image sensor, processing the third image frame to produce a third image covering a third sensor detection region of the image sensor and having a third resolution throughout the third image, and outputting the third image, wherein the third sensor detection region corresponds to the first sensor detection region, and wherein the third resolution corresponds to the first resolution;
d) during a fourth time interval sequentially following the third time interval, capturing a fourth image frame of the surroundings with the image sensor, processing the fourth image frame to produce a fourth image covering a fourth sensor detection region of the image sensor and having a fourth resolution throughout the fourth image, and outputting the fourth image, wherein the fourth sensor detection region is only a portion of the first sensor detection region and consists of the central region and a right region extending contiguously on a right side of the central region, and wherein the fourth resolution corresponds to the second resolution; and
e) repeating the steps a) to d) sequentially to produce an output image sequence comprising a repeating cycle of several successive sets of the first, second, third and fourth images at a predetermined frame rate;
wherein:
the central region is output in all of the images at 100% of the predetermined frame rate,
the left region is output in 75% of the images at 75% of the predetermined frame rate, and
the right region is output in 75% of the images at 75% of the predetermined frame rate.

16. The method according to claim 15, further comprising performing object detection on the images of the output image sequence, and performing a driver assistance function with a driver assistance system of the vehicle in response to and dependent on a result of the object detection.

17. The method according to claim 15, wherein the first sensor detection region and the third sensor detection region each correspond to an entirety of a field of view of the image sensor, the left region extends from the central region continuously to a left edge of the field of view, the right region extends from the central region continuously to a right edge of the field of view, and the left, central and right regions all exclude an upper edge region of the field of view that extends between an upper edge of the field of view and the left, central and right regions.

18. The method according to claim 17, wherein the left, central and right regions all exclude a lower edge region of the field of view that extends between a lower edge of the field of view and the left, central and right regions.

19. The method according to claim 15, wherein the processing of the first image frame and the processing of the third image frame each comprise pixel binning, the second resolution and the fourth resolution each correspond to a full maximum pixel resolution of the image sensor, and the first resolution and the third resolution each correspond to a fractional portion of the full maximum pixel resolution as a result of the pixel binning.

* * * * *